(12) United States Patent
Gujral

(10) Patent No.: US 11,842,407 B2
(45) Date of Patent: *Dec. 12, 2023

(54) PARAMETRIC INSTRUMENTS AND METHODS RELATING TO GEOGRAPHICAL AREA BUSINESS INTERRUPTION

(71) Applicant: MACHINE COVER, INC., Wenham, MA (US)

(72) Inventor: Inder-Jeet Singh Gujral, Wenham, MA (US)

(73) Assignee: MACHINE COVER, INC., Wenham, MA (US)

( * ) Notice: Subject to any disclaimer, the term of this patent is extended or adjusted under 35 U.S.C. 154(b) by 262 days.

This patent is subject to a terminal disclaimer.

(21) Appl. No.: 17/393,772

(22) Filed: Aug. 4, 2021

(65) Prior Publication Data

US 2021/0366053 A1 Nov. 25, 2021

Related U.S. Application Data

(63) Continuation-in-part of application No. 16/999,880, filed on Aug. 21, 2020, which is a
(Continued)

(51) Int. Cl.
*G06Q 40/08* (2012.01)
*G06Q 10/06* (2023.01)
*G06Q 10/067* (2023.01)

(52) U.S. Cl.
CPC ........... *G06Q 40/08* (2013.01); *G06Q 10/067* (2013.01)

(58) Field of Classification Search
CPC .. G06Q 40/08; G06Q 10/067; G06Q 30/0202; G06Q 30/0283; G06Q 30/04; G06Q 50/18; G06Q 10/10
See application file for complete search history.

(56) References Cited

U.S. PATENT DOCUMENTS

| 6,058,102 A | 5/2000 | Drysdale |
| 10,713,727 B1 | 7/2020 | Floyd |

(Continued)

FOREIGN PATENT DOCUMENTS

| CN | 1940988 | 4/2007 |
| CN | 101075316 | 11/2007 |

(Continued)

OTHER PUBLICATIONS

Ali Torabi, "An enhanced risk assessment framework for business continuity management systems", 2016, Safety Science 89 (2016), pp. 201-218. (Year: 2016).*

(Continued)

*Primary Examiner* — Tan D Nguyen
(74) *Attorney, Agent, or Firm* — NIXON & VANDERHYE P.C.

(57) ABSTRACT

A parametric instrument having a cost and a payout is administered relating to business interruption of an instrument holder. Administration includes measuring economic activity in a plurality of commerce zones using objective data over a period of time, and determining conditions of whether the economic activity in one of the plurality of commerce zones drops by a predefined percentage relative to others of the plurality of commerce zones, whether the economic activity drop is unpredictable, and whether the economic activity drop is sustained over a predefined period of time. When the conditions are satisfied, the payout is automatically paid to the instrument holder.

17 Claims, 5 Drawing Sheets

Related U.S. Application Data continuation-in-part of application No. 16/857,213, filed on Apr. 24, 2020, now abandoned, which is a continuation-in-part of application No. 16/430,547, filed on Jun. 4, 2019, now abandoned.

(60) Provisional application No. 62/680,032, filed on Jun. 4, 2018.

(56) References Cited

U.S. PATENT DOCUMENTS

| | | |
|---|---|---|
| 2001/0037205 A1 | 11/2001 | Joao |
| 2001/0051884 A1 | 12/2001 | Wallis |
| 2002/0038366 A1 | 3/2002 | Harasawa |
| 2002/0065731 A1 | 5/2002 | Schloss |
| 2003/0149657 A1 | 8/2003 | Reynolds |
| 2004/0064351 A1 | 4/2004 | Mikurak |
| 2004/0078290 A1 | 4/2004 | Mester |
| 2004/0186753 A1 | 9/2004 | Kim |
| 2005/0001040 A1 | 1/2005 | Berstis |
| 2005/0137914 A1 | 6/2005 | Schmitter |
| 2007/0288373 A1* | 12/2007 | Wilkes ............ G06Q 20/108 705/42 |
| 2008/0103785 A1 | 5/2008 | Logan |
| 2008/0103835 A1 | 5/2008 | Corcoran |
| 2008/0103972 A1* | 5/2008 | Lanc ............ G06Q 20/405 705/44 |
| 2008/0177648 A1* | 7/2008 | Doyle ............ G06Q 30/06 705/1.1 |
| 2009/0303056 A1 | 12/2009 | Bresch |
| 2010/0005004 A1 | 1/2010 | Hudak et al. |
| 2013/0103593 A1* | 4/2013 | Watts ............ G06Q 30/02 705/302 |
| 2014/0279450 A1* | 9/2014 | Gujral ............ G06Q 30/04 705/40 |
| 2014/0310186 A1 | 10/2014 | Ricci |
| 2016/0117785 A1* | 4/2016 | Lerick ............ G06Q 10/20 705/305 |
| 2016/0148224 A1* | 5/2016 | Misra ............ G06Q 30/0202 705/7.31 |
| 2016/0148318 A1* | 5/2016 | Moynihan ............ G06Q 40/08 705/4 |
| 2016/0155098 A1 | 6/2016 | McElhinney |
| 2016/0189129 A1* | 6/2016 | Yang ............ G06Q 20/3829 705/39 |
| 2016/0239683 A1* | 8/2016 | Gujral ............ G06F 21/6272 |
| 2016/0359683 A1 | 12/2016 | Bartfai-Walcott |
| 2017/0013011 A1 | 1/2017 | Renouil |
| 2018/0128856 A1 | 5/2018 | Lee et al. |
| 2018/0181144 A1 | 6/2018 | Steinmann |
| 2019/0370814 A1 | 12/2019 | Gujral |
| 2020/0380609 A1 | 12/2020 | Gujral |

FOREIGN PATENT DOCUMENTS

| | | | |
|---|---|---|---|
| CN | 102083950 | | 6/2011 |
| CN | 103077441 | | 5/2013 |
| CN | 105279960 A * | 1/2016 | |
| CN | 106461252 | | 2/2017 |
| CN | 106462848 A * | 2/2017 | ............ G06G 20/02 |
| CN | 110276620 A * | 9/2019 | ......... G06Q 20/4016 |
| WO | WO 02/15088 | | 2/2002 |
| WO | WO 2007/005975 | | 1/2007 |
| WO | WO 2008/016931 | | 2/2008 |
| WO | WO 2008/050132 | | 5/2008 |
| WO | WO 2008/093211 | | 8/2008 |
| WO | WO-2008093211 A2 * | 8/2008 | ............ G06Q 40/04 |
| WO | WO 2009/051365 | | 4/2009 |
| WO | WO-2011068800 A1 * | 6/2011 | ......... G06Q 20/4016 |

OTHER PUBLICATIONS

Jiao Sun, "FraudVis: Understanding Unsupervised Fraud Detection Algorithms," 2018, 2018 IEEE Pacific Visualization Symposium, pp. 170-174. (Year: 2018).*

Selim Aissi, "E-Business Process Modeling: The Next Big Step," May 2002, IEEE 2002, pp. 55-62. (Year: 2002).*

U.S. Office Action dated Sep. 13, 2021 issued in U.S. Appl. No. 16/521,293, 42 pp.

U.S. Office Action dated Oct. 5, 2021 issued in U.S. Appl. No. 16/430,547, 35 pp.

U.S. Office Action dated Oct. 5, 2021 issued in U.S. Appl. No. 16/857,213, 34 pp.

Raphael Moura, Learning from Major accidents: Graphical representation and analysis of multi-attribute events to enhance risk communication, Nov. 2017, Safety Science, vol. 99, Part A, pp. 58-70 (Year: 2017).

McLeod, D, Advances in Autonomous Deppwater Inspection, 2013, Offshore Technology Conference, Abstract. (Year: 2013).

Randhawa, Kuldeep et al., "Credit Card Fraud Detection Using AdaBoost and Majority Voting," IEEE Access, vol. 6, Mar. 28, 2018, pp. 14277-14284.

U.S. Office Action dated Oct. 6, 2022 issued in U.S. Appl. No. 16/999,880, 25 pp.

Hui, S.C. et al., "Data Mining for Customer Service Support", 2000, Information & Management 38 (2000), pp. 1-13. (Year: 2000).

Aissi, Selim et al., "E-Business Process Modeling: The Next Big Step", May 2002, IEEE, pp. 55-62. (Year: 2002).

Cohn, Alan et al., "Smart After All: Blockchain, Smart Contracts, Parametric Insurance, and Smart Energy Grids," Georgetown Law Technology Review, vol. 1:2, 2017, pp. 273-304.

World Elite MasterCard Cardholder Guide to Benefits, Acessed via WayBack Machine: https://web.archive.org/web/20170627160209/ https://gif.barclaycardus.com/servicing/img/base/guideBenefits/BAR-5819-1.pdf, Jun. 27, 2017, 44 pp.

U.S. Office Action dated Mar. 30, 2021 issued in U.S. Appl. No. 16/521,293, 33 pp.

International Search Report and Written Opinion dated Nov. 9, 2021 issued in PCT International Patent Application No. PCT/US2021/045527, 20 pp.

Savino Giovanni et al., "Decision Logic of an Active Braking System for Powered Two Wheelers," 2011, J Automobile Engineering 226(8), (Year: 2011), pp. 1026-1036.

U.S. Office Action dated Nov. 26, 2021 issued in U.S. Appl. No. 16/911,617, 35 pp.

Wang, Lei et al., "On the Brink: Predicting Business Failure with Mobile Location-Based Checkins," (Wang et al.) <Downloaded from the internet: https:www.sciencedirect.com/science/article/abs/pH/S016792361 5000810 > <Downloaded On: Oct. 13, 2021> <Date of Publication: Apr. 23, 2015> entire document, especially: fig. 1-2; pp. 4 left column first paragraph, pp. 7 left col. third paragraph, 11 pp.

* cited by examiner

PARAMETRIC INSTRUMENTS AND METHODS RELATING TO GEOGRAPHICAL AREA BUSINESS INTERRUPTION

CROSS-REFERENCES TO RELATED APPLICATIONS

This application is a continuation-in-part (CIP) of U.S. patent application Ser. No. 16/999,880, filed Aug. 21, 2020, pending, which is a continuation-in-part (CIP) of U.S. patent application Ser. No. 16/857,213, filed Apr. 24, 2020, which is a continuation-in-part of U.S. patent application Ser. No. 16/430,547, filed Jun. 4, 2019, which claims the benefit of U.S. Provisional Patent Application No. 62/680,032, filed Jun. 4, 2018, the entire contents of each of which are herein incorporated by reference.

STATEMENT REGARDING FEDERALLY SPONSORED RESEARCH OR DEVELOPMENT (Not Applicable)

BACKGROUND

The invention relates to parametric instruments and, more particularly, to systems and methods for developing and administering a parametric instrument associated with business interruption.

The shortcomings of business interruption in existing commercial insurance policies have come to the fore during the current Covid crisis. In general, as companies have suffered unexpected shortfalls in revenues as well as service-level and employee-benefit implications of laying off employees, they have found that business interruption as currently conceived in commercial insurance policies has tended to fall short.

This has resulted in a variety of negative consequences including an explosion in lawsuits as well as regulatory intervention. While it is expected that commercial insurers will swiftly introduce modified/tightened language in future commercial insurance policies to better protect themselves, this will not necessarily solve policy holder problems.

The general idea of parametrics is well established since parametrics around natural catastrophes such as hurricanes have been offered previously (e.g., "if X weather condition occurs, the instrument pays $Y to do what you like with . . . ").

However the concept of a general-purpose technological platform for parametrics has not been proposed.

SUMMARY

It would be desirable to provide an instrument based on parametric methods. The instrument may be purchased as an independent product or as an add-on to a conventional commercial insurance policy.

A parametric instrument is viable where the nature of a "mishap" is defined in advance, and the mechanism by which the occurrence of this mishap can be observed by any interested party is also defined in advance (in other words, the fact of whether the mishap has occurred is not disputable, and it may be verified externally and independently by any interested party). For instance, a mishap may be defined as 'flight landed 2 hours or more after it was scheduled to.' The fact that this mishap did or did not occur is easily and independently verifiable by examining U.S. Bureau of Transport data or the airline's own data or the experience of passengers on that flight.

The parametric instrument of the described embodiments relates to substantial business interruption, for example where a business sees a drop in activity of some predetermined percentage (i.e., "non-damage" business interruption). The predetermined percentage drop is in economic activity in the immediate vicinity of the business, and not necessarily of the business itself. The distinction is significant, because a drop in economic activity in a specific area (e.g. the numbers of motor vehicles traversing this area) can be measured objectively, whereas a specific drop in economic activity at the business itself may be due to a host of reasons that have to do with action/inaction by the business. Therefore, it is possible that an 80% activity drop in the area may mean a 62% drop as far as this business is concerned, or a 91% drop etc. However, in a parametric, there is no concern with the specifics of the drop as experienced by the particular business—the only concern is with drop in activity insofar as it affects all enterprises in the area.

The instrument provides the business owner with a payout or other benefit if the drop in economic activity exceeds the predefined amount. Because the business interruption event (or "mishap") is readily verifiable and not disputable, there is no claim to process, but can rather be promptly administered. The payout or benefit may be fixed regardless of the extent of drop in business beyond the predefined threshold amount, or it may alternatively vary by the extent to which the business drops past the predefined threshold amount.

An idea behind the described family of parametric instruments is that retail transactions (however performed) are a good proxy for economic activity in a particular area. In an exemplary application, the present system/methodology utilizes a large number of card transactions to measure economic activity. References to "card transactions" and/or "card data" and/or "card transaction volume" etc. are intended to refer to credit-card transactions, for example via Visa or Mastercard or American Express etc., as well as debit cards, gift cards, ApplePay, GooglePay and the like.

Measurable characteristics to administer the parametric instrument include:

(a) DEPTH—Consider the depth of the economic drop in the area under consideration, as compared to the reference area (where the reference area might be the state, the nation, all coastal areas, etc.). For example, if the commercial activity in the nation plunged 5% in a given month, and some specific area plunged 30% in that same month, then the plunge of the area relative to the nation is 25%. That way, the system is able to isolate issues that may be specific to this area as opposed to issues that might affect the whole reference area.

(b) PREDICTABILITY—If economic activity dropped 25% from December to January but that kind of post-holiday season slump is seen each year, then the slump was predictable. Predictability can be measured using historical data.

(c) LONGEVITY—Whether the economic activity plunged and then recovered within a short period of time (e.g., a month), or whether the economic activity stayed bad for many months.

The parametric instrument concept allows for the creation of at least two classes of insurance products:

(1) MASS-MARKET PARAMETRICS: for example, a barbershop or nail salon might want to hedge against the risk of the kind of plunge described above, by paying for a parametric instrument that pays them a fixed amount (e.g., $20,000) if the above happens. The point is that the buyer can decide what they can afford up-front and also what they will be paid if the predefined commercial plunge occurs.

(2) CUSTOM PARAMETRICS: the same general idea, but custom-built for larger buyers who might want payouts in the millions or tens of millions of dollars and whose needs are quite specific. For example:

(a) FOOTBALL STADIUM—A football stadium makes its money selling tickets and concessions. When people come to a game, they often patronize restaurants and bars before and/or after the event. Thus, one can use economic activity in those types of businesses around the stadium on game nights as a proxy for how well-attended the games are and thus how much money is coming into the stadium. If the area is struck by some situation (e.g., Covid) whereby games are cancelled or attendance is depressed, that means economic trouble for the stadium. The stadium may wish to hedge against that kind of occurrence by buying a parametric instrument that says something like "if the relevant economic transaction volume drops 50+% on game nights then you shall receive a $10 million payout . . . ."

(b) CITY GOVERNMENT—The budget of a city government is directly or indirectly related to foot traffic and economic activity (sales taxes, parking meters, traffic tickets, VAT in some countries, etc.). As above, if something like Covid comes along and the city's revenues plunge, the city may choose to hedge against that by buying a parametric instrument that says something like "if the level of economic activity in the geographic area of your city limits drops by 50+%, you shall receive a $50 million payout . . . ."

In an exemplary embodiment, a method of administering a parametric instrument relating to business interruption of an instrument holder includes the steps of (a) identifying a geographical land area; (b) dividing the geographical land area into a plurality of sectors; (c) identifying a plurality of commerce zones from the plurality of sectors, wherein a commerce zone is a sector including a predefined minimum number (e.g., a minimum number) of merchants that satisfy predefined criteria; (d) measuring economic activity in each of the plurality of commerce zones using objective data over a period of time; (e) determining conditions of whether the economic activity in one of the plurality of commerce zones drops by a predefined percentage relative to others of the plurality of commerce zones, whether the economic activity drop is unpredictable, and whether the economic activity drop is sustained over a predefined period of time; and (f) when the conditions in step (e) are satisfied, automatically paying the payout to the instrument holder.

The geographical land area in step (a) may be an entire country, or the mainland United States or generally a region comprising several countries, or just a single country, or even a portion of a country.

Step (b) may be practiced by dividing the geographical land area into a plurality of substantially equal geometric areas such as squares, and of a modest size such as 1-2 square miles.

The predefined criteria in step (c) may include a minimum amount of transaction revenue over a predefined timeframe, which may be daily.

The objective data in step (d) may be any data set that may act as a proxy for economic activity. Examples may include satellite images, energy emissions, detailed sales data, data on inventory levels, data on vehicular traffic, data on card transactions, etc.

Step (e) may include determining whether the economic activity in the one of the plurality of commerce zones drops by the predetermined percentage relative to a remainder of the plurality of commerce zones. Step (e) may include determining whether the economic activity may be predictable by comparing the economic activity with historical economic data.

Step (f) may be practiced without a claim, request or communication from the instrument holder.

The payout may be fixed and may be disassociated with instrument holder loss.

The method may further include, after step (f), terminating the parametric instrument.

In some embodiments, the method includes utilizing an underwriting engine to simulate administration of the parametric instrument by setting proposed instrument characteristics and referencing historical data. The utilizing step may enable setting a risk threshold and defining which of the commerce zones are suited for the parametric instrument.

In another exemplary embodiment, a method of administering a parametric instrument relating to business interruption of an instrument holder includes the steps of (a) measuring economic activity in a plurality of commerce zones using objective data over a period of time; (b) determining conditions of whether the economic activity in one of the plurality of commerce zones drops by a predefined percentage relative to others of the plurality of commerce zones, whether the economic activity drop is unpredictable, and whether the economic activity drop is sustained over a predefined period of time; and (c) when the conditions in step (b) are satisfied, automatically paying the payout to the instrument holder.

BRIEF DESCRIPTION OF THE DRAWINGS

These and other aspects and advantages will be described in detail with reference to the accompanying drawings, in which.

DETAILED DESCRIPTION

A parametric instrument is viable where the nature of the covered event or "mishap" is defined in advance, and the mechanism by which the occurrence of the mishap can be observed by any interested party is also defined in advance. That is, the fact of whether the mishap has occurred is not disputable, and it may be verified externally and independently by any interested party. The parametric instrument of the described embodiments protects companies from losses associated with substantial (non-damage) business interruptions.

Figure 1:
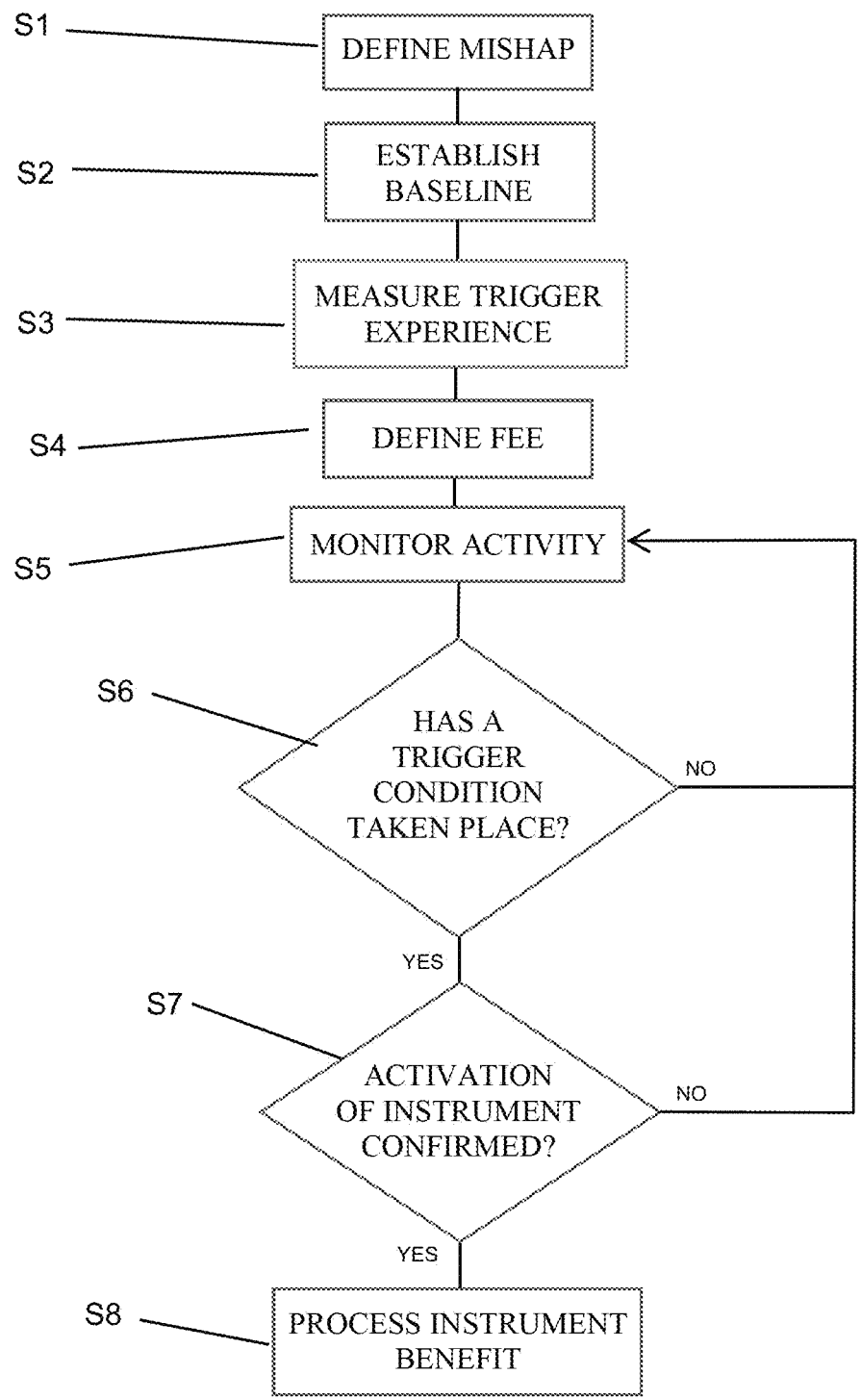
FIG. 1 is a flow diagram showing the methods of administering the parametric instrument according to the described embodiments.
Figure 2:
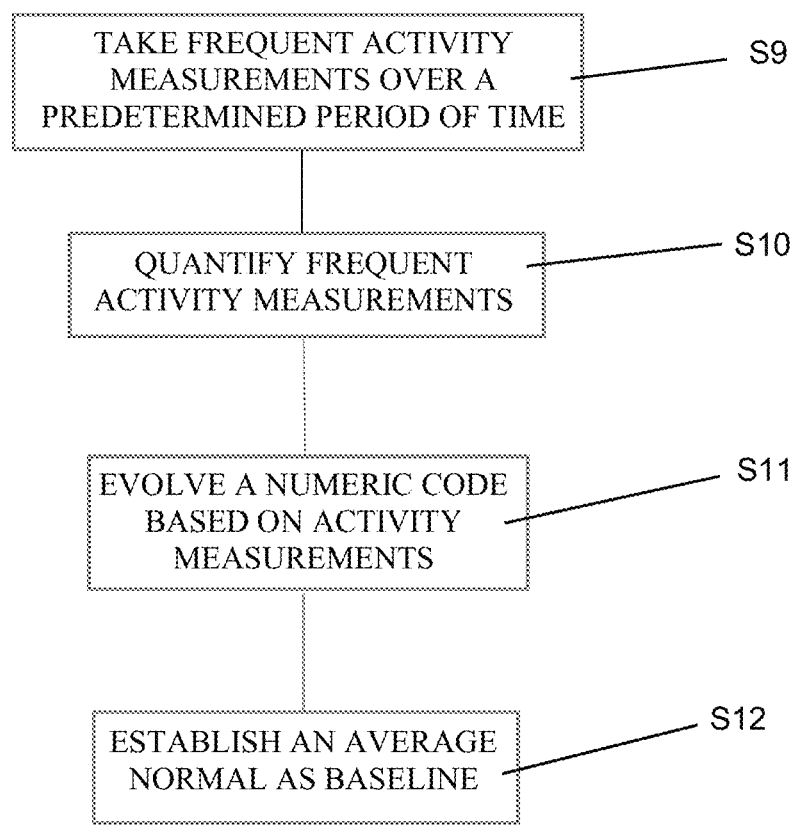
FIG. 2 is flow chart showing a determination of the baseline operating parameter.

FIG. 1 is a flow diagram of the process for administering the parametric instrument. Further details of the process steps are described below. In step S1, a mishap for coverage by the parametric instrument is defined. As noted, the mishap should be identifiable and verifiable after occurrence. A baseline operating parameter for which the mishap is applicable is established (S2). Details of the processes associated with establishing the baseline operating parameter will be described below with reference to FIG. 2.

The parametric does not depend upon a definition of 'normal.' For instance, in an exemplary embodiment, satellite imagery may be used as the basis for a baseline operating parameter. Each pixel in a given satellite image corresponds to an area of three meters by three meters (3 m×3 m). Thus, the 'color' expressed by the pixel will depend upon what the satellite 'sees' on the ground in that 3×3 space. The system can take, for example, daily (or other frequency) measurements of the same area (each satellite photo covers 1 km×1 km) (step S9). If the satellite took a picture each day in calendar 2019, a 'normal' year, the images of course would change, but not in a drastic way. Thus, their variations may be considered 'normal'.

If on the other hand we looked at these images from January 2020 through June 2020, we would see the consequences of sharply decreased activity (i.e., much fewer cars, many fewer people, sharply reduced smoke plumes, 'heat spillage' and so on). This would be 'abnormal'. The measurements from step S9 can be quantified (S10), and the system may evolve a numeric code that summarizes what is portrayed in the satellite images (S11). Normalizing the code, it can be assumed that 'average normal' is, for example, 100, and 'range of normal' is, for example, 75 to 125 (S12). Of course, these parameters are exemplary, and the invention is not necessarily meant to be limited to the exemplary range.

In step S3, a trigger experience is measured, which enables a fee structure to be defined for the parametric instrument (S4). In order to determine pricing, an "economic cell" (e.g., a boundary area surrounding a covered company's physical location such as a two-mile radius circle) may be established. The economic cell may also correspond to the commerce zone mentioned previously and below. In some embodiments, measuring the trigger experience involves determining a percentage chance of the trigger condition taking place within the economic cell.

Figure 3:
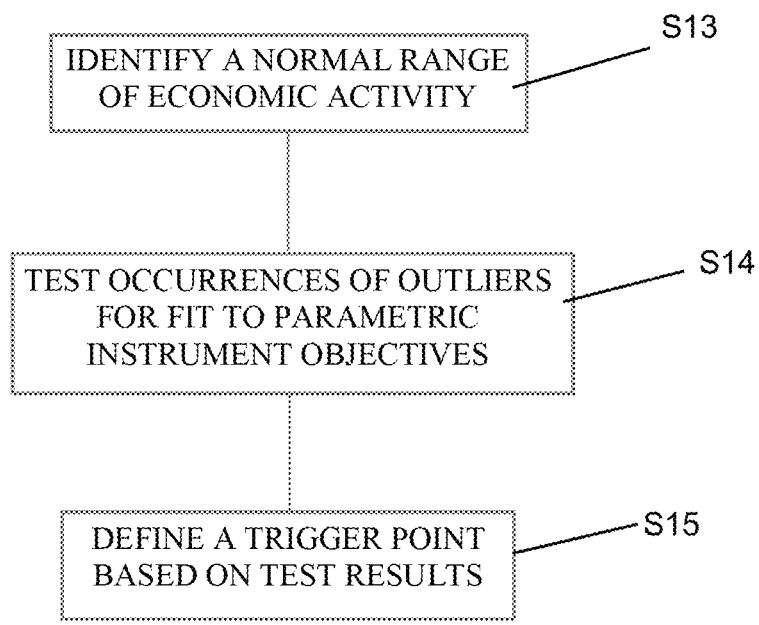
FIG. 3 is a flow chart showing a determination of a percentage chance of triggering the parametric instrument.

With reference to FIG. 3, determination of the percentage trigger chance is a quantitative exercise where the system identifies the normal range (e.g., normalized between 75-125, for example) (step S13), and the system can determine the percentage of time an extreme condition (e.g., 25) occurs, while this extreme condition is highly infrequent and indicative of severe abnormality. For example, the system may test occurrences of outliers with a frequency that fits objectives of the parametric instrument (i.e., the extreme condition) (S14). The system can determine a suitable trigger based on the expected frequency of the severe abnormality, i.e., the percentage chance of the trigger condition (S15).

Historical data can be analyzed to determine the percentage chance. In an exemplary embodiment, historical satellite images can be processed to determine how frequently a predefined trigger condition has taken place over a certain period of time (years, decades, etc.). The data can be run through an artificial intelligence (AI) algorithm in order to estimate the probability of a predefined percentage drop in economic activity for a particular business and/or for the particular economic cell. There are several known AI platforms suitable for analyzing and coordinating the data. An exemplary platform is the SageMaker platform from AWS (Amazon Web Services). The use and functionality of the SageMaker platform are described at https://docs.aws.amazon.com/sagemaker/latest/dg/how-it-works-mlconcepts.html, the content of which is hereby incorporated by reference.

A calculation is made to determine the percentage chance or probability of a fixed percentage drop in economic activity in the economic cell. For example, it may be determined that there is a 0.005% probability that economic activity within the economic cell will drop by 80% at any time. It is also helpful to determine ranges of normal economic activity. The fee structure for the parametric instrument can be defined based on this data.

In steps S5-S7, it is determined whether a trigger condition has taken place for which the mishap is applicable, and activation of the parametric instrument is confirmed. In some embodiments, S5-S7 may be practiced by measuring a triggered operating parameter and identifying and confirming the trigger condition when the triggered operating parameter satisfies predetermined trigger criteria. More specifically, a trigger scan may be performed to determine that the trigger condition has taken place. The system could be predisposed such that a reading of 25 or lower (for example) would only rarely occur, and it can be determined that 25 is set as the 'parametric trigger' (based on the normalized "normal" exemplary range of 75-125). Thus on a given day, the reading might be 50, which is definitely below the normal range, but not low enough to trigger the parametric. If on the other hand, the reading is 24, then it would be 'acutely abnormal' and more important, it would be less than 25, and therefore, the parametric would trigger and the entity that had purchased the parametric would be paid.

Any objective methodology for determining a drop in economic activity may be used. A color analysis of satellite images is discussed above. Another exemplary methodology for determining a drop in economic activity may include monitoring traffic volume in a vicinity of a physical location of the company using GPS or the like. Alternatively, the trigger scan may be accomplished by monitoring energy emissions in a vicinity of a physical location of the company. Detailed sales data or data relating to changes in inventory levels etc. may also be used.

Yet another alternative to the use of satellite images to measure economic activity is the use of card transaction volume within the economic cell. The system can utilize data from card sources to identify and quantify economic activity. For example, assuming card transaction volume of businesses within the economic cell or within an alternative boundary or among a preset number of businesses closest to the instrument holder drops by a certain percentage, the instrument benefit can be triggered. The use of card transaction data is discussed in more detail below. As before, the drop in economic activity should be sustained for a defined period of time before triggering the instrument benefit.

Still other mechanisms for monitoring economic activity may be utilized, and the invention is not meant to be limited to a particular method.

When a trigger condition has taken place (YES in S6), activation of the parametric instrument is confirmed (S7). After determining the trigger condition and confirming the activation of the parametric instrument, the instrument benefit is processed (S8). In some embodiments, processing the instrument benefit refers to paying a payout to the company. The payout may be fixed or may vary by degree of the percentage drop in economic activity. The formula by which the payout is determined is not in any way related to the triggering mechanism and it may be arbitrarily complex.

Examples may be: (1) If economic activity is above X percent, there is no payout; if economic activity is at or below X percent, then the instrument pays out a first amount; and/or for each percent interval below X percent (e.g., 10 percent intervals), the instrument payout is increased by some additional amount.

Because the mishap is objectively identifiable and verifiable after occurrence, there is no dispute or claims adjusters, etc.

In an exemplary application, consider an instrument purchaser that has a chain of department stores with 100 locations. The system analyzes indices of economic activity within economic cells around these 100 locations. As noted above, economic activity can be represented via traffic volume measured using GPS or the like, energy emission via satellite imagery, satellite imagery 'color' processing, or other mechanisms (e.g., card transactions described in more detail below). An exemplary economic cell may be a 2-mile radius circle around each of the 100 locations. Using the methodologies described above, taking one location for example, it is determined that the probability of an 80% drop in activity in that economic cell is 0.005%. It is understood that variations in normal economic activity occur, for example by 25%, independent of any action by the instrument purchaser, but the instrument presumes that variations far beyond normal (i.e., abnormality severe enough to cause actual economic pain to the instrument holder) may trigger the parametric instrument.

The parametric instrument provides a benefit to the instrument purchaser any time economic activity at one of their locations drops by a certain amount, for example, 80%, over a certain period of time (e.g., days, weeks, months, etc.). In the event of such a drop in economic activity, the instrument purchaser is provided with an instrument benefit, such as a financial payout. To protect the provider, the instrument may impose payout limits. From the instrument purchaser's viewpoint, if something happens that is out of their control, the instrument purchaser receives a quick 'no-questions' payout that can help with cash-flow or the like while their primary policy may be going through a more detailed and time-consuming claims process.

As another example, consider a barbershop near a large factory. The factory is owned by some company elsewhere. The company decides, for their own reasons, to shut down the factory, causing 100% of the plant's employees to lose their jobs. The barbershop revenue depends substantially on factory workers. With the factory out of commission, the barbershop could see a drop in economic activity exceeding 80%. Traditional insurance products do not insure against this type of "outside-your-control" drop in revenues. The parametric instrument of the described embodiments provides a payout that relies on the measurement of factors that are external to the particular business.

Using satellite imagery can provide access to the entire planet and is particularly suited for relatively densely inhabited areas since it takes fewer images to analyze a target area. The number of images taken by satellite is likely identical in all cases since the resolution is always one pixel per 3×3 meters. Since many more instruments are likely to be sold in a given built-up area, the effective cost of imagery/analysis per sold instrument would be much lower for built-up areas.

As noted, variations may include, for example, sliding-scale payouts that vary by degree of abnormality.

Figure 4:
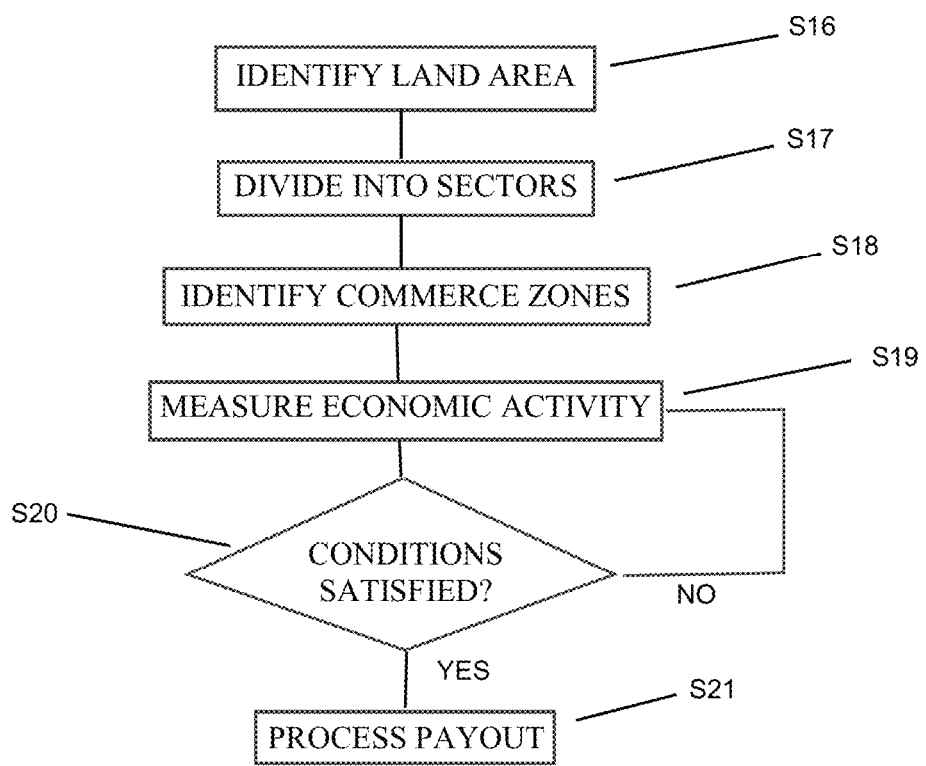
FIG. 4 is a flow chart showing details relating to geographical area business interruption.

FIG. 4 is a flowchart showing details relating to geographical area business interruption. The United States, for example, has several million retail businesses, i.e. businesses that depend upon 'foot traffic' to generate revenues. These can range from nail salons and barbershops to auto dealers and supermarkets. All of these businesses currently buy insurance which generally deals with two kinds of losses: (1) those related to direct damage, e.g., their building caught fire, inventory was stolen, etc.; and (2) those relating to business interruption (e.g., it may take months to repair/replace the building or inventory above, during which time it may be difficult to conduct business).

There is, at the moment, no way to deal with a different kind of loss—where something happens that doesn't result in an insurance claim (e.g. a water-main break down the street, a disease outbreak, a terror attack, a major employer nearby that closes, smoke from wildfires, a chemical-plant explosion nearby, etc.) but which nonetheless causes a sharp drop in business and which is outside the power of the business to deal with.

The land area of the mainland United States (i.e., 48 states, not including Alaska and Hawaii) is approximately 3 million square miles. With reference to FIG. 4, the mainland United States can be used as an exemplary land area (S16). Let us divide this area into roughly 2.5 million squares or sectors, each encompassing between 1 and 2 square miles (mapping from the surface of planet Earth to a 2D projection) (S17). Since locations are known, each of the millions of merchants in the U.S. can be assigned to one of these squares. As one might expect, a lot of these squares have no merchants (e.g., they may be forest, desert, farmland, water), while other squares may have hundreds of merchants. Of the squares we started with, commercial zones can be defined (S18) that have:

A certain minimum number of merchants that fall into
A number of distinct retail categories, which collectively generate
At least a defined amount of transaction revenue each day
. . . and a number of other characteristics.

In an exemplary embodiment, the commercial zones are the only sectors or squares in which the parametric instrument of the described embodiments may be applicable.

By way of example, an instrument holder purchased a 1-year parametric instrument for their business by paying $200 for a $10,000 payout. While the policy is live, the instrument administrator performs a check each month. For this instrument to trigger (i.e., for the business to get paid), three things must all be true:

(1) The commercial zone in which the business resides suffered a sharp fall in economic activity compared to a larger pool of commercial zones (e.g., all of the commercial zones in the nation).
(2) This fall should not be predictable (in the sense of occurring after holiday season or after a tourist season).
(3) This fall must be ongoing, i.e., things have gone bad and remained bad, and didn't get fixed quickly.

The instrument relates to the economic activity of the instrument holder's commercial zone, which may have dozens or hundreds of businesses of all kinds, not the instrument holder's economic activity specifically.

The instrument administrator accesses objective measures of economic activity such as card transactions across millions of businesses nationwide (including many in the instrument holder's commercial zone) (S19). For instance, if card transactions fall 40% somewhere in a short time, no one saw the drop coming, and the drop endures (S20), then something bad (economically speaking) must have happened in that place, and the business might want to protect itself. In some embodiments, the parametric instrument is one-and-done, i.e., if it triggers, the instrument is terminated immediately.

The parametric instrument of the described embodiments offers the instrument holder a way to address issues that may severely affect their business, but for which there is no way to offload risk—essentially anything that is both local and not the fault of the instrument holder, and which also does not damage the assets of the business, thus not triggering their regular insurance. While no one likes to buy insurance, the logic for buying the parametric instrument of the described embodiments is the same as for any other insurance policy—it is easier to come up with $200 each year than to suddenly come up with $10,000 when disaster strikes. The instrument holder does not need to do anything to get paid—there are no claims to file, no FNOL ("first notice of loss") etc. The instrument administrator informs the instrument holder when their instrument triggers and thus when they are owed money (S21, YES in S20). So, the only time they ever hear from the administrator, is if there is good news to report. Otherwise, the administrator continues to measure economic activity (S19, NO in S20). Additionally, the instrument holder gets paid a lot more promptly than via a conventional policy, which is important to smaller businesses that have not amassed a few weeks of working capital.

In some instances, the policyholder may be required to submit a document or the like as a precondition to being paid. For example, there may be situations where the instrument holder is informed that their parametric has triggered and thus a payout is waiting for them, but in order for the payout to be processed, the administrator may require (a) the first page of their most recent Federal Tax filing, and/or (b) the first page of their Charter of Incorporation, and/or (c) something similar.

That is, in some instances, merely triggering a parametric may not be enough for the instrument holder to get paid as there may be cases where the instrument holder made assertions when buying the parametric (e.g., checking the box that they are a Chapter-C Corporation incorporated in Delaware). Had the parametric not triggered, it would make no difference whether this assertion was in fact true or not, since they purchased the instrument and no payout was due. If their parametric triggers, the administrator may require some kind of proof of their assertions.

In respect of fraud and risk avoidance, it is difficult to commit fraud around the parametric instrument of the described embodiments since the objective measure of economic activity—e.g., billions of card transactions—cannot be 'fiddled with' by buyer or seller. Nonetheless, it may be wise to examine a variety of risk classes and how they may be dealt with. Some examples are provided below.

Moral Hazard: Since neither the buyer nor the seller can 'fiddle with' the details of any significant number of transactions (as noted above), the parametric instrument of the described embodiments does not suffer from moral hazard.

Adverse Selection: The only way to experience adverse selection in the parametric instrument of the described embodiments is where some commercial zones have a higher inherent propensity to trigger than others. This is easily observed by examining historical data.

Longevity/Validity Risk: It is desirable to avoid 'fly-by-night' instrument holders and purchasing for nefarious purposes.

Basis Risk: Basis risk is conventionally defined as the difference between loss as modeled and loss as actually experienced. In the case of the parametric instrument of the described embodiments, the notion of basis risk is irrelevant since the instrument holder receives a defined amount when a defined event occurs, and the payout is unrelated to loss as experienced by the instrument holder.

Individual Risk: It is desirable to avoid a situation where an individual instrument holder is able to purchase an instrument with an inordinately high payout.

Concentration Risk: It is desirable to impose limits on the risk of non-diversified sales.

Aggregate Risk: It is desirable to impose limits on the total amount of risk taken on.

Generally speaking, any insurance product involves an 'event' (some type of adverse and fortuitous occurrence that raises the possibility of a claim/payout) and a 'loss' (some type of loss suffered by the holder as a result of this event). In the case of the parametric instrument of the described embodiments (and parametrics in general), the 'event' certainly exists, but the notion of 'loss' in the indemnity sense does not exist. That is, with the parametric instrument of the described embodiments, the instrument holder is not expected to exactly estimate their loss nor compare it with their payout. Provided the payout is small, no one can argue that the instrument holder will get an economic windfall from the payout, nor that the payout is not reasonably in the ballpark of the loss that might be suffered from such events. The high speed of the payout is particularly relevant to instrument holders without big capital reserves. The instrument holder cannot buy policies with payouts that are disproportionate to what they might expect to lose.

An analysis needed prior to taking a parametric such as the parametric instrument of the described embodiments to market differs considerably from what is usual for an indemnity-oriented P&C product. Some key differences to bear in mind, are:

(1) There is no need to analyze both frequency as well as severity of loss, because severity is predetermined (by the payout amount) and therefore the problem reduces to analyzing frequency only. Therefore, the underwriting engine for the parametric instrument of the described embodiments (described in more detail below) focuses on frequency, i.e., determining the probability that an instrument will trigger (and thus cause a payout) at some point within the twelve months that it is in effect.

(2) Since the frequency (of trigger and therefore payout) depends on what parametric trigger is used, there is no single loss ratio. The expected losses depend upon how often payouts occur, which in turn depends on what the settings of the parametric trigger are. For example, if the Risk Threshold is set to 20% (meaning that our area of interest must do 20% worse than the larger geographical; area (e.g., the nation) as well as itself a year ago etc. in order to trigger), far more triggers are likely to occur than if the threshold was set to 40% instead. Of course, it is possible that the instrument holder may simply not buy the instrument if the trigger is set to 40%-below because they think it will never happen to them and/or if things get that bad, they'll probably be out of business anyway. Thus, it is desirable to balance the frequency of payouts against sales volume. In some embodiments, the risk threshold may be set between 25-40%, and in still other embodiments, the risk threshold is set at 33%.

(3) In order to avoid accumulation (concentration) risk, the parametric instrument of the described embodiments can be constrained by a ceiling of how much risk can be taken on in a given area, in the same way as for an indemnity product. However, the existence of such a ceiling has no consequential effect on the inherent probability of triggering. What it accomplishes is the avoidance of extreme outcomes—or to put it in statistical terms, it tightens the distribution of outcomes, i.e., reduces the standard deviation of the curve. Therefore, the underwriting engine does not include the ability to impose ceilings on commercial zones, but before any instrument can be sold, the seller can impose all sorts of constraints including this kind of ceiling on how much risk can be taken on per area.

Figure 5:
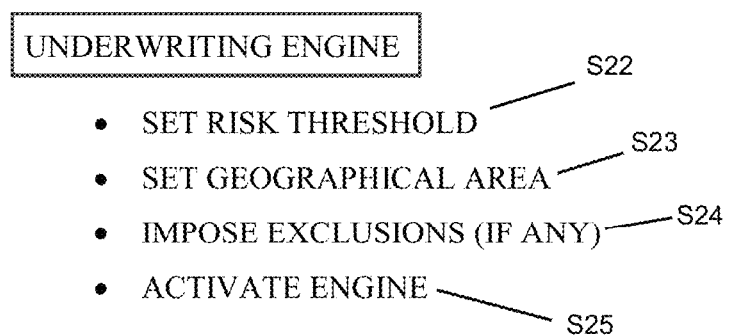
FIG. 5 is a flow chart showing the underwriting engine process.

In order to assist underwriters and providers of capacity for the parametric instrument of the described embodiments, the administrator offers an underwriting engine where the user can run a variety of potential/sample scenarios. See FIG. 5. Once a user of the engine has logged in, they can run a test scenario that allows them to:
 (a) set a risk threshold (S22);
 (b) set the geographical area (e.g., which U.S. states in which an instrument based on such a threshold, is to be sold) (S23); and
 (c) impose (or not impose) particular exclusions (S24).

As a default, the administrator may include a default exclusion that can be enabled, which is the declaration by the WHO (World Health Organization) of a global pandemic and its lifting. The declaration occurred on Mar. 21, 2020 and it has not yet been lifted. The definition of the parametric instrument of the described embodiments assumes that no instrument may trigger for any reason while an ongoing exclusion is in effect.

Once the user sets these values, they can activate the simulation (S25), which applies these settings to roughly 435 million data points across the U.S. and calculates the probability that one (1) instrument, sold in these states with this risk threshold and this exclusion would trigger and thus cause a payout.

The process used to calculate the trigger probability (which are the same conditions that would be evaluated in a 'live' version of the instrument) are as follows:
 (1) Our unit of area is the commercial zone (defined above), which is a square/sector of 1-2 square miles (e.g., roughly 1.2 miles each side).
 (2) The system uses card-transaction data from across the geographic area (e.g., all squares that cover U.S. territory) covering the period Jan. 1, 2018 through Apr. 1, 2021 with daily (or other frequency) data for each of those commercial zones on each of those dates as relevant. Considered individually, that translates to tens of billions of individual card transactions. Aggregated per commercial zone, that translates to roughly 435 million data points. The card-transaction data is available for purchase/license from the card providers (e.g., Visa, Mastercard, Apple, etc.).
 (3) Any square/sector that we do not consider 'instrument-worthy' is omitted from consideration, i.e., it is not used in this calculation, and in some embodiments, when the instrument becomes active, no instances of the instrument are permitted to be sold in such a sector (i.e., a sector that does not qualify as a commercial zone). A sector may be considered unqualified if it is not generating enough data (in terms of numbers of transactions as well as dollar volume of transactions) to enable the reasonable calculations of statistical outcomes, or if it is determined that the sector has a particularly high propensity to trigger for any reason.
 (4) In mainland U.S., there are roughly 28,000 commercial zones, which as expected tend to fall in urban and suburban areas with a high volume of merchants and transactions per sector. If the provider selects particular states in the U.S. for the sale of the instrument, all squares not falling into those states are omitted from consideration.
 (5) The trigger calculation involves calculating the probability of a trigger across each of these 28,000 (or as relevant) commercial zones, and then calculating the mean of these individual probabilities.
 (6) A trigger is an event that the buyer of an instrument would like to insure against and expect to be paid a predetermined amount if/when it happens. A trigger occurs if all of the conditions below are met, and an objective of the underwriting engine is to be the determination by a provider of capacity for the parametric instrument of the described embodiments, and of the probability of a trigger happening for any instrument based on historical patterns.

The conditions are: (a) the commercial zone the instrument holder is in must suffer a drop in economic activity compared to the nation in general; (b) this drop must be unpredictable (e.g., not in the sense of occurring after the holiday season or after a 'tourist' season, etc.); and this drop must be ongoing, i.e., things have gone bad and remained bad.
 (7) What triggers is a commercial zone, and thus any instruments in it that happen to be live at that time are triggered.
 (8) In some embodiments, any time a commercial zone triggers, that zone is automatically deemed unqualified for the next 365 days. We do not want to sell instruments in zones that are already doing demonstrably badly.
 (9) The administrator ensures that it has data for at least a period of 1 year+3 months any time a trigger probability is calculated.
 (10) An instrument may be sold on any date, and once sold: (a) it goes into effect on the next day; and (b) it ceases to be in effect in one of three situations (i) it triggers, (ii) it is terminated by the administrator, and (iii) its life ends one year from the date it was sold. If the relevant date does not exist in the next year (e.g., February 29), then it terminates on the next day.
 (11) In some embodiments, once an instrument goes into effect, the administrator checks for its triggering a maximum of ten times. In other words, the life of an instrument may be twelve months, and during these twelve months, the administrator checks for a trigger at the ends of months three through twelve. So, for example if an instrument was sold on January 19th, it goes into effect on January $20^{th}$, and the corresponding trigger-check dates are the 20th of each month thereafter. In cases where the relevant date does not exist (e.g., 31st in some months or 29th, 30th or 31st in February), the trigger check is conducted on the next day.
 (12) To determine the probability of a trigger, the system adds up the probabilities of trigger during each of these checks, keeping in mind that in some embodiments, the instrument is one-and-done, i.e., as soon as it triggers, it ends and furthermore, that triggered commercial zone automatically becomes unqualified for a year, i.e., no instruments can be sold into such commercial zones for a year after their trigger date.
 (13) In order to determine that an instrument triggers on a particular day, assume that the check is for month M (where M is the month immediately preceding the date on which the check occurs), and assume that the user has selected a Risk Threshold of T. The system performs the following calculations:
  a. Calculate the average daily transaction volume (dollars spent on total retail) within the commercial zone into which this instrument was sold, in three periods: Month M-2, Month M-1 and Month M. These results are identified as SV1, SV2 and SV3.
  b. Calculate the average daily transaction volume across the entire geographical area in three periods: Month M-2, Month M-1 and Month M. These results are identified as NV1, NV2 and NV3.
  c. Calculate the average daily transaction frequency (number of transactions) within the commercial zone into which this instrument was sold, in three periods: Month M-2, Month M-1 and Month M. These results are identified as SF1, SF2 and SF3.
  d. Calculate the average daily transaction frequency across the entire geographical area in three periods: Month M-2, Month M-1 and Month M. These results are identified as NF1, NF2 and NF3.
  e. Calculate the average daily transaction volume within the commercial zone into which this instrument was sold, one year prior to the current date, in two periods: Month M-14 and Month M-13. These results are identified as SLV1 and SLV2.
  f. Calculate the average daily transaction frequency within the commercial zone into which this instrument was sold, one year prior to the current date, in two periods: Month M-14 and Month M-13. These results are identified as SLF1 and SLF2.
(14) In some embodiments, this commercial zone is considered to trigger if all of the following three conditions are true:
  a. The commercial zone suffers a drop. This is considered true if both of the below are true:
    i. (SV2*100)/SV1 is worse than (NV2*100)/NV1 by at least T
    ii. (SF2*100)/SF1 is worse than (NF2*100)/NF1 by at least T
  b. The drop is unpredictable. This is considered true if both of the below are true:
    i. (SV2*100)/SV1 is worse than (SLV2*100)/SLV1 by at least T
    ii. (SF2*100)/SF1 is worse than (SLF2*100)/SLF1 by at least T
  c. The drop is ongoing. This is considered true if both of the below are true:
    i. (SV3*100)/SV1 is worse than (NV3*100)/NV1 by at least T
    ii. (SF3*100)/SF1 is worse than (NF3*100)/NF1 by at least T
(15) The above process is repeated for all instruments for the entire period for which data exists, in order to arrive at the desired trigger probability.

Once a potential provider has run a number of simulations on the underwriting engine and decided that the parametric instrument of the described embodiments is worth taking to market, it is desirable to fully define this provider's version of the instrument in the administrator's product definition system before it can be taken to market. The product definition system allows the provider to fully define parameters of the instrument as it will be sold by them.

Some of the settings in the system include the list below:
  1. Area Limits—This product shall only be available for sale in the defined areas (e.g., identified U.S. states).
  2. Payout Range—The instrument holder may only select a payout between $X and $Y with a step-function of $Z.
  3. Overall Cap—No more than $X in payout risk shall be sold in aggregate.
  4. Square Cap—No more than X % of the overall cap above, shall be sold to instrument holders in any single commercial zone.
  5. Blacklist—If a square or sector has been deemed unqualified, no sales of any instrument are permitted in this square.
  6. Deductibles—The policy comes with no deductible—in fact the concept is absent in this class of instrument.
  7. Exclusions—Exclusions (such as WHO pandemic declarations, named storms, etc.) can be defined here.
  8. Longevity—Instrument holders have to have been located in the same commercial zone and filing tax returns for at least X years prior to the purchase of this instrument.
  9. Validity—Instrument holders must be subject to the laws of X and be validly constituted businesses as evidenced by their possession of Y (e.g., a Federal Tax ID).
  10. Payout Cap—No instrument holder may select a payout that exceeds X % of their revenue as reported in the most recent tax filing.

The parametric instrument of the described embodiments may be applicable in the context of a family of financial products rather than the insurance-type product described above. For example, a bank may extend a commercial loan to a small business where normally the small business is required to pay X per month for principal repayment and Y for interest. However, if the small business purchases a parametric instrument associated with the loan for Z per month, the parametric instrument would cover X and Y for those months when the area around the small business plunges compared to some larger region.

The parametric instrument of the described embodiments is applicable to any trigger condition or "mishap" that is identifiable and verifiable after occurrence, where the chances of occurrence can be reasonably estimated. As far as a parametric is concerned, the instrument triggers/pays out upon a particular measured condition being reached. There are no other considerations. In all these cases, the parametric instrument may be regulated as an insurance product or as a warranty instrument or as something else—but that does not affect the basic design of the mechanism nor the technology needed to implement it.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of administering a parametric instrument relating to business interruption of an instrument holder, the parametric instrument having a cost and a payout, the method comprising:
  (a) identifying a geographical land area;
  (b) dividing the geographical land area into a plurality of sectors;
  (c) identifying a plurality of commerce zones from the plurality of sectors, wherein a commerce zone is a sector including a predefined number of merchants that satisfy predefined criteria;

(d) measuring economic activity in each of the plurality of commerce zones using objective data over a period of time;

(e) determining conditions of whether the economic activity in one of the plurality of commerce zones drops by a predefined percentage relative to others of the plurality of commerce zones, whether the economic activity drop is unpredictable, and whether the economic activity drop is sustained over a predefined period of time; and (f) when the conditions in step (e) are satisfied, automatically paying the payout to the instrument holder, wherein step (d) is practiced by identifying credit card transaction volume in each of the plurality of commerce zones and converting the credit card transaction volume to a quantification of the economic activity in the commerce zones, the method further comprising comparing the quantification of the economic activity in the one of the plurality of commerce zones to the others of the plurality of commerce zones, wherein the condition in step (e) relating to the drop in economic activity comprises a predefined drop in the credit card transaction volume that is determined based on the comparison.

2. A method according to claim 1, wherein the geographical land area in step (a) is an entire country or multiple countries or portions of a single country.

3. A method according to claim 1, wherein the geographical land area corresponds to mainland United States.

4. A method according to claim 1, wherein step (b) is practiced by dividing the geographical land area into a plurality of substantially equal squares.

5. A method according to claim 4, wherein the substantially equal squares are between 1-2 square miles.

6. A method according to claim 1, wherein the predefined criteria in step (c) comprises a minimum amount of transaction revenue over a predefined timeframe.

7. A method according to claim 6, wherein the predefined timeframe is daily.

8. A method according to claim 1, wherein step (e) comprises determining whether the economic activity in the one of the plurality of commerce zones drops by the predetermined percentage relative to a remainder of the plurality of commerce zones.

9. A method according to claim 1, wherein step (e) comprises determining whether the economic activity is predictable by comparing the economic activity with historical economic data.

10. A method according to claim 1, wherein step (f) is practiced without a claim, request or communication from the instrument holder.

11. A method according to claim 1, wherein the payout is fixed and is disassociated with instrument holder loss.

12. A method according to claim 1, further comprising, after step (f), terminating the parametric instrument.

13. A method according to claim 1, further comprising utilizing an underwriting engine to simulate administration of the parametric instrument by setting proposed instrument characteristics and referencing historical data.

14. A method according to claim 13, the utilizing step enabling setting a risk threshold and defining which of the commerce zones are suited for the parametric instrument.

15. A method of administering a parametric instrument relating to business interruption of an instrument holder, the parametric instrument having a cost and a payout, the method comprising:

(a) measuring economic activity in a plurality of commerce zones using objective data over a period of time;

(b) determining conditions of whether the economic activity in one of the plurality of commerce zones drops by a predefined percentage relative to others of the plurality of commerce zones, whether the economic activity drop is unpredictable, and whether the economic activity drop is sustained over a predefined period of time; and (c) when the conditions in step (b) are satisfied, automatically paying the payout to the instrument holder, wherein step (a) is practiced by identifying credit card transaction volume in each of the plurality of commerce zones and converting the credit card transaction volume to a quantification of the economic activity in the commerce zones, the method further comprising comparing the quantification of the economic activity in the one of the plurality of commerce zones to the others of the plurality of commerce zones, wherein the condition in step (b) relating to the drop in economic activity comprises a predefined drop in the credit card transaction volume that is determined based on the comparison.

16. A method according to claim 15, further comprising utilizing an underwriting engine to simulate administration of the parametric instrument by setting proposed instrument characteristics and referencing historical data.

17. A method according to claim 16, wherein setting proposed instrument characteristics and referencing historical data comprises setting a risk threshold, setting a geographical area, and imposing particular exclusions.

* * * * *